(12) United States Patent
Nelissen

(10) Patent No.: US 8,190,438 B1
(45) Date of Patent: May 29, 2012

(54) TARGETED AUDIO IN MULTI-DIMENSIONAL SPACE

(75) Inventor: Marco Nelissen, San Jose, CA (US)

(73) Assignee: Google Inc., Mountain View, CA (US)

( * ) Notice: Subject to any disclaimer, the term of this patent is extended or adjusted under 35 U.S.C. 154(b) by 428 days.

(21) Appl. No.: 12/579,037

(22) Filed: Oct. 14, 2009

(51) Int. Cl.
*G10L 21/02* (2006.01)
*H04R 27/00* (2006.01)

(52) U.S. Cl. .......................................... 704/274; 381/85

(58) Field of Classification Search .................. 704/270, 704/274; 381/300–310, 85, 89, 332
See application file for complete search history.

(56) References Cited

U.S. PATENT DOCUMENTS

| | | | |
|---|---|---|---|
| 4,866,776 A * | 9/1989 | Kasai et al. ................... | 381/302 |
| 5,105,462 A | 4/1992 | Lowe et al. | |
| 5,208,860 A | 5/1993 | Lowe et al. | |
| 5,912,976 A * | 6/1999 | Klayman et al. ............... | 381/18 |
| 7,099,483 B2 * | 8/2006 | Inagaki ........................... | 381/77 |
| 7,760,889 B2 * | 7/2010 | Form et al. ...................... | 381/86 |
| 8,041,052 B2 * | 10/2011 | Hopkins .......................... | 381/81 |
| 2003/0142835 A1 * | 7/2003 | Enya et al. ....................... | 381/86 |
| 2005/0128106 A1 | 6/2005 | Nakaishi et al. | |
| 2005/0190935 A1 | 9/2005 | Sakamoto | |
| 2006/0262935 A1 | 11/2006 | Goose et al. | |

* cited by examiner

*Primary Examiner* — Abul Azad
(74) *Attorney, Agent, or Firm* — Fish & Richardson P.C.

(57) ABSTRACT

In general, the subject matter described in this specification can be embodied in methods, system, and program products for providing sound from multiple audio sources. A first audio stream is played from a first source through a multi-speaker audio system. A signal indicating a need to play a second audio stream is received from a second source. Adjustments to be made to the first audio stream to move an acoustic image of the first audio stream in multi-dimensional space from a first location to a second location are determined. Adjustments are applied to a signal of the first audio stream in order to move the acoustic image of the first audio stream from the first location to the second location. The second audio stream is played so that an acoustic image of the second audio stream is located in a third location. The first audio stream is simultaneously played.

20 Claims, 7 Drawing Sheets

TARGETED AUDIO IN MULTI-DIMENSIONAL SPACE

TECHNICAL FIELD

This document generally describes techniques, methods, systems, and mechanisms for providing targeted audio to a listener in multi-dimensional space.

BACKGROUND

The invention of the transistor enabled small, portable, and reliable audio devices. As a result, people moved from having plug-in home radios, to having small transistor radios, boom boxes, portable tape players with headphones, and now to the ubiquitous use of portable MP3 players by people of all ages. People also listen to the radio or recorded music in their cars, and through headphones while commuting, working, or walking around town. Such devices also are used to produce audio streams other than music or radio, including audio books, telephone conversations, navigational instructions (e.g., "turn right"), warnings ("please put on your seat belt"), and confirmations ("you are listening to 101.3 FM").

With all of these available audio sources, and with many of these sources being combined by a single unit, such as by a smart telephone or vehicle information system (built into the vehicle's audio system), it is not surprising that a user will be faced with multiple incoming audio streams at once. In some systems, when such an event occurs, a most important audio stream may be determined (e.g., warnings are more important than telephone calls, which are more important than music or radio), and that most important stream may be played while other sources are muted or substantially muted. When the most important stream ends, the other streams may be brought back in amplitude until another important audio stream is received by the user's device.

SUMMARY

This document describes techniques, methods, systems, and mechanisms for providing targeted audio to a listener in multi-dimensional space. In general the features discussed here may play a first audio stream to a listener and, when a second audio stream arrives, move the first audio stream to a targeted location in multi-dimensional space to make room for the incoming stream. The first stream may or may not be reduced in volume or muted. When the second stream has ended, the first stream may be moved back into its original location, such as by music or radio being played in its original form so as to fill the space.

As one example, a driver in an automobile is listening to music over the automobile audio system while driving to work. A telephone call arrives from the driver's friend on the driver's smart telephone, which may be coupled, using conventional mechanisms, to a speakerphone system that is integrated with the audio system of the automobile. Instead of stopping the playing of the music during the call or substantially reducing the volume of the playing music to a level that the user cannot hear at all, the features discussed herein may adjust the signal for the music to move the location at which the user hears the music, thus opening a location to play the user's friend's voice. For example, the phase and amplitude of the signals sent to each of the automobile's speakers may be adjusted in a manner that the music appears to be coming from well behind the user, and the voice of the friend appears to be coming from in front of the user. Thus, the friend's voice will be located as the central focus for the user, but the user can overcome that focus and turn his or her attention to the music during the telephone call (e.g., if the friend places the driver on hold). When the telephone call has ended (e.g., by the user's smart telephone signaling the user's automobile audio system), the music may return to its original status.

In some examples, upon arrival of the telephone call, the music is muted as the telephone call ring displaces the music. The driver can answer the call or decline the call. If the call is answered, a music resumes and a location of the music is moved to open a space for the telephone conversation. If the call is declined, the ring may cease and the music may resume playing in its original location.

In some examples, upon arrival of the telephone call, a location of the music may be moved to open space for the ringing telephone. If the driver answers the call, the telephone conversation may stream from the location of the ringing. In another example, if the driver answers the call, the music may be muted and the telephone conversation may shift back towards an original location of the music prior to receipt of the telephone call. If the driver declines the call, the ringing may cease and the music may move back to its original location.

In general one aspect of the subject matter described in this specification can be embodied in a computer-implemented method for providing sound from multiple audio sources. A first audio stream is played from a first source through a multi-speaker audio system. A signal indicating a need to play a second audio stream is received from a second source through the multi-speaker audio system. Adjustments to be made to the first audio stream to move an acoustic image of the first audio stream in multi-dimensional space from a first location to a second location are determined. An acoustic image is an apparent location of a source of an audio stream. Adjustments are applied to a signal of the first audio stream in order to move the acoustic image of the first audio stream from the first location to the second location. The second audio stream is played so that an acoustic image of the second audio stream is located in a third location that is different from the second location. The first audio stream is simultaneously played in the second location.

Another aspect of the subject matter described in this specification can be embodied in a system for providing positional sound from multiple audio sources. The system includes a multi-channel electronic amplifier arranged to produce signals for producing audible sound on multiple independent channels. The system includes a plurality of individually addressable speakers, with each speaker connected to one of the channels of the electronic amplifier. The system includes an acoustic image generation unit programmed to modify a signal for a first audio stream upon identifying an arrival of a second audio stream, so as to provide one or more signals to the amplifier so that an acoustic image for the first audio stream is positioned at a location in multi-dimensional space that is separated from a location in multi-dimensional space for an acoustic image of the second audio stream when the first and second audio streams are reproduced simultaneously by the speakers. An acoustic image is an apparent location of a source of an audio stream.

Another aspect of the subject matter described in this specification can be embodied in a system for providing positional sound from multiple audio sources. The system includes a multi-channel electronic amplifier arranged to produce signals for producing audible sound on multiple independent channels. The system includes a plurality of individually addressable speakers, with each speaker connected to one of the channels of the electronic amplifier. The system includes means for modifying a signal for a first audio stream upon identifying an arrival of a second audio stream, so as to provide one or more signals to the amplifier so that an acoustic image for the first audio stream is positioned at a location in multi-dimensional space that is separated from a location in multi-dimensional space for an acoustic image of the second audio stream when the first and second audio streams are reproduced simultaneously by the speakers. An acoustic image is an apparent location of a source of an audio stream.

These and other implementations can optionally include one or more of the following features. The first audio stream can include a stream of playing music. The second audio stream can include a portion of a spoken conversation. The spoken conversation can be carried on between a synthesized voice warning unit and a user listening to the first and second audio streams. The spoken conversation can be a two-way spoken conversation between an incoming telephone caller and a user listening to the first and second audio streams. Applying the adjustments can include adjusting phase and volume of the signal of the first audio stream independent of other audio streams. Adjusting the phase and volume of the signal can include performing a lookup in a spatial targeting table that identifies values for positioning a sound at a determined location in three-dimensional space.

Moving the acoustic image of the first audio stream from the first location to the second location can include moving the acoustic image of the first audio stream to a location substantially behind a user who is listening to the first audio stream. Playing the second audio stream so that an acoustic image of the second audio stream is located in a third location that is different from the second location can include placing the acoustic image of the second audio stream at a location substantially in front of the user. User input can be received that indicates a need to rotate the locations of the acoustic images. Adjustments can be applied to signals of the first audio stream and the second audio stream in order to rotate the locations acoustic images substantially about a position of a user listening to the first and second audio streams.

A second signal can be received that indicates a need to play a third audio stream from a third source. In response to receiving the second signal, adjustments can be applied to the signal of the first audio stream in order to move the acoustic image of the first audio stream to a new location. Adjustments can be applied to a signal of the second audio stream in order to move the acoustic image of the second audio stream to a new location. The third audio stream can be played so that an acoustic image of the third audio stream is located in a location that is different from the new locations of the acoustic images for the first and second audio streams. Data can be presented for displaying icons corresponding to the first and second audio streams on a visual display of a computing device. The icons can be located at locations on the display corresponding to locations of the acoustic images in multi-dimensional space. The acoustic images for the first audio stream and the second audio stream can be controlled virtual sound sources that appear to a listener to be separate from the locations of the speakers in the multi-speaker audio system.

A microphone amplifier can be arranged to receive signals from a microphone and provide the signals for transmission as an outgoing channel of a two-way spoken communication session, wherein at least one of the audio streams includes received audio from an incoming channel of the two-way communication. A sound cancellation unit can cancel noise received at the microphone amplifier that is from audio streams that do not include the incoming channel of the two-way communication. An electronic device can be arranged to wirelessly transmit an audio stream. A wireless interface can be adapted to wirelessly receive the second audio stream and identify arrival of the second audio stream to the acoustic image generation unit. A display device can be arranged to display icons at locations in the display device that represent a spatial arrangement of the acoustic images in multi-dimensional space. An input device can be arranged to (a) receive user input selecting an audio stream from a collection of audio streams, and (b) assign the selected audio stream to a location in the displayed representation of the spatial arrangement of the acoustic images.

The acoustic image generation unit can modify a signal for the selected audio stream, so as to provide one or more signals to the amplifier so that an acoustic image for the selected audio stream is positioned at a location in multi-dimensional space that corresponds to the assigned location in the displayed representation of acoustic images. The acoustic image generation unit can be further programmed to modify the signal for the first audio stream upon identifying the arrival of the second audio stream, so as to provide one or more signals to the amplifier in order to move the acoustic image of the first audio stream from a first location to the positioned location. Providing the one or more signals to the amplifier can include adjusting phase and volume of the signal for the first audio stream independent of the second audio stream. The acoustic image generation unit can be further programmed to modify the signal for the first audio stream and a signal for the second audio stream upon identifying an arrival of a third audio stream, so as to provide one or more signals to the amplifier so that the acoustic images for the first audio stream and second audio stream are positioned at locations in multi-dimensional space that are separated from a location in multi-dimensional space for an acoustic image of the third audio stream when the first, second, and third audio streams are reproduced simultaneously by the speakers.

Particular embodiments can be implemented, in certain instances, to realize one or more of the following advantages. Playing audio streams that appear to come from different locations can enable a listener of the audio streams to switch his or her focus from one stream to another. The listener can follow the shifting location of one stream and maintain his or her focus on the shifting stream as a new stream is introduced in a different location. The movement of existing streams to new locations emphasizes the introduction of a new stream, even when the introduced stream has a low volume and would otherwise be difficult to distinguish if played together. Also, where there are multiple listeners in a space, such as a driver and passenger in an automobile, one listener can focus more easily on one stream and the other listener on the other stream.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

This document generally describes providing targeted audio to a listener in multi-dimensional space. The features described herein generally describe the playing of a first audio stream over a multi-speaker sound system through multi-dimensional space. Upon receiving an indication that a second audio stream is to be played over the multi-speaker sound system, an acoustic image for the first audio stream is moved to a different location. The acoustic image is an apparent location of a source of an audio stream. For example, an acoustic image can be a controlled virtual sound source. A location of the virtual sound source can appear to a listener to separate from the location of the speakers. For example, a listener of the first audio stream may perceive a location of a virtual speaker for the first audio stream moving as though someone had picked up a single speaker playing the stream and physically moved the speaker. During, or after, movement of the acoustic image for the first stream, the second audio stream can be played over the multi-speaker sound system with an acoustic image in a location different than that for the first audio stream. The audio streams appear to a listener to be played at the same time or simultaneously.

Figure 1:
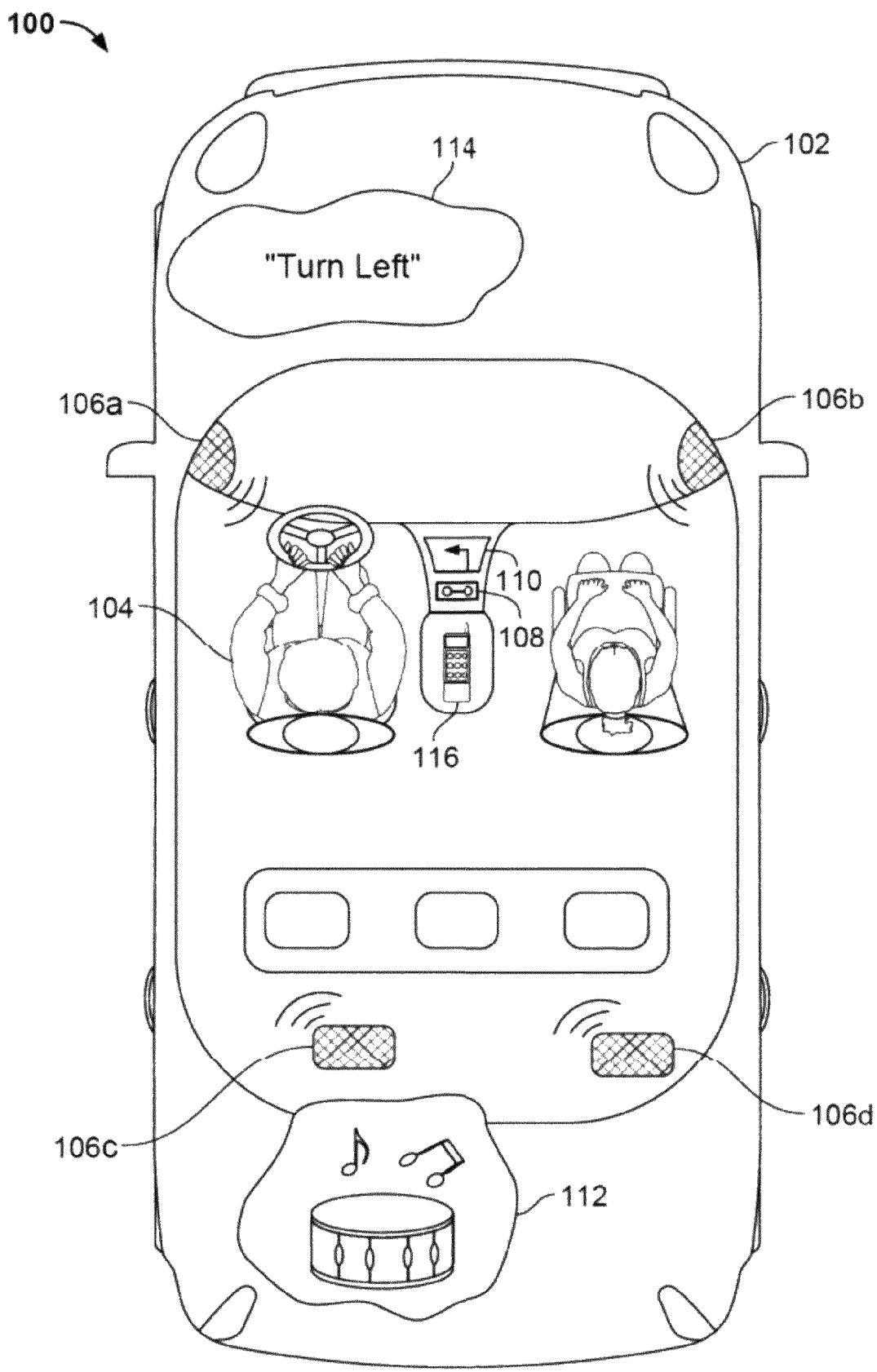
FIG. 1 is a conceptual diagram of a system for providing targeted audio to a listener in multi-dimensional space.

An illustration is provided in FIG. 1, a conceptual diagram of a system 100 for providing targeted audio in multi-dimensional space. The diagram illustrates some of the features described herein as they are implemented in a car 102. A driver 104 is sitting in the driver's seat of the car 102 and is listening to music playing from four speakers 106*a-d*. The speakers 106*a-d* are powered and controlled by an in-dash deck 108 and the music from the deck 108 is played over the speakers 106*a-d* in the car's factory default audio settings.

Today, in this example, the driver 104 is going to the zoo and the car's integrated navigational system 110 provides the driver 104 with audible turn-by-turn directions for navigating to the zoo. If the driver 104 wants to make it before closing time, he must make a left turn at the next highway exit. The navigational system 110 recognizes the need to turn left and plays a voice command "Turn Left" 114 over the car's speaker system. Instead of solely muting or reducing the volume of the music played over the speaker system when the navigational voice command is played, the deck 108 sends adjusted audio signals to the speakers to move a perceived location of the music from all around the driver 104 to behind the driver 104. For example, if music 112 initially appeared to the driver 104 to play from all surrounding locations, a perceived location of the music may begin to shift toward a rear of the car and consolidate to radiate noise from a audio point source that is behind the driver 104.

The navigational voice command "Turn Left" 114 then appears to pop up at a location in front of the driver 104 and slowly gets louder. The shifting of the music 112 to the rear of the car not only alerts the driver 104 that a second audio stream is about to be played, but allows the driver 104 to distinguish between the two streams and focus his attention on either the music or the navigational commands.

In this illustration, the driver's mobile telephone 116 wirelessly communicates with the deck 108 (e.g., using BLUETOOTH protocols) to play incoming telephone calls over the car's audio system. While the music 112 is playing to the rear of the driver and the navigational voice command is playing to the front of the driver 104, an incoming telephone call from the driver's mother arrives. The mobile telephone 116 signals the car deck 108 that the call is arriving and the locations of the music stream 112, the navigational voice command 114, or both can move to different locations to provide space for the incoming cell telephone audio stream. For example, the location of the music may shift to the right-rear and the voice commands may shift to the left-rear. The audio stream from the incoming telephone call can then appear in front of the driver, creating a two-dimensional triangle of point sources for the audio streams.

In this example, the conversation between the driver 104 and the caller on the telephone is a two-way conversation, whereas the conversation between the navigational voice command 114 and the driver is a one-way conversation. Three-way conversations may also be included, such as those in which the driver 104 communicates on a conference call or the driver 104 and a caller invoke a voice-enabled search system over their connection to answer questions for them into their telephone connection (e.g., where the automobile includes such functionality, and the caller and search voices may be localized separately for the driver 104, or where the functionality is provided by a system such as a VoIP system that connects the driver's calls and the synthesized voice may be localized in the same location as the caller's voice).

The shifting of the audio stream can occur at different speeds. For example, an audio stream can shift from a first position (prior to the introduction of another audio stream) to a second position (subsequent to the introduction of the other audio stream) over a time period of 0.1, 0.3, 0.5, 0.8, 1.0, or 1.5 seconds, as a few examples. The localized position of the audio stream can move at a speed of 0.1, 0.3, 0.5, 1, 3, 5, or 10 meters a second, to name a few examples.

In some implementations, certain overlapping audio sources may be addressed by moving the location of an initial stream and others may not. In particular, short verbal cues may simply result in reducing the volume of the initial stream rather than moving it, if it is determined that moving the location of the stream can only occur slowly while maintaining user interest in the system. Likewise, while three overlapping streams were handled in the example above, giving each a virtual location in space, such overlapping may be handled by pausing, muting, or reducing in volume one of the sources, so that a user need only deal with two simultaneous streams at any time.

The positioning of various audio sources in space may be executed using one of various techniques for generating multi-dimensional (e.g., 3D) audio. For example, transfer functions may be determined with respect to phase and amplitude of output signals or sound to be provided by a system of loudspeakers. The transfer functions may describe operations needed to place a sound at a particular location or locations in space (approximately). The transfer functions may operate, for example, on the relative amplitude and timing (as expressed by signal phase) of sounds emitted from different speakers in a multiple-speaker sound system. The particular differences in amplitude and timing may be designed so as to "trick" a listener into believing that a sound is coming from a particular location. Specifically, humans understand sound to come from a particular point because their two ears hear the sound differently. For example, a sound from a user's right side will sound louder to the user's right ear and will also arrive sooner at the user's right ear, i.e., it will have a higher amplitude and leading phase as compared to the sound coming to the left ear. Humans process such minor differences automatically into an understanding about the location of the source of the sound.

Thus, systems like those described here may receive an initial signal or signals and may apply particular transfer functions for varying the amplitude and phase of the signals (among other things) to be sent to each loudspeaker, and may then combine the various signals into an output to be provided by the overall system. Various techniques may also be used to simplify such systems, such as by defining transfer functions for only one hemisphere of a space, and then inverting the signals sent to right and left speakers in order to place the signal in the opposite hemisphere. Various systems that may be used for placing sound include the Ambisonics techniques and systems by Spatializer Audio Laboratories (Woodland Hills, Calif.).

Figure 2A:
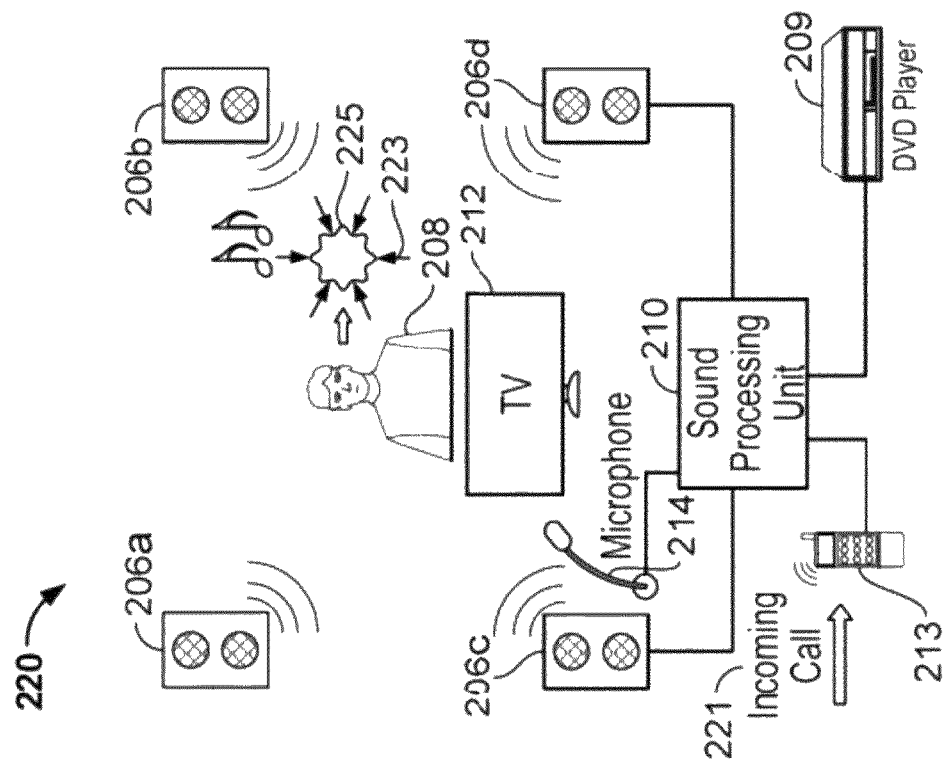
FIGS. 2A-D are conceptual diagrams of another system for providing targeted audio to a listener in multi-dimensional space.

FIGS. 2A-D are conceptual diagrams of another system for providing targeted audio to a listener in multi-dimensional space. These diagrams illustrate a sequence of an acoustic image for an audio stream transitioning to a new location as another audio stream is introduced. As illustrated in FIG. 2A, a user 208 is watching a movie on a television 212 in a home theater environment 200. The audio soundtrack for the movie is provided by a DVD player 209 to a sound processing unit 210. The sound processing unit powers the speakers 206a-d. While four speakers are shown here, other arrangements, including typical 5.1, 6.1, and 7.1 arrangements may also be provided.

The movie soundtrack 202 envelops the user, filling the room with a virtual sound landscape of noises from different virtual objects. For example, the user may hear a car start in front of him as an individual in the movie jumps in a car and turns a key. Virtual bullets may whiz past the user's head and disappear behind him. The positioning of the sounds from the car and the bullets is determined by the movie, or more specifically the information encoded on the DVD in the player 209.

The user 208 may wish to receive telephone calls during the movie but may not want to pause the movie every time someone calls. Appropriately, the mobile telephone 213 can connect to the sound processing unit 210. When the mobile telephone 213 is connected to the sound processing unit 210 in this manner, the sound processing unit 210 can receive audio from incoming telephone calls and play the audio over the speakers 206a-d. The mobile telephone 213 can physically connect to the sound processing unit 210 (e.g., with a USB cable) or can wirelessly communicate with the sound processing unit 210 (e.g., over a Wi-Fi network while in the user's pocket). The user 208 may select an option on the mobile telephone 213 or the sound processing unit 210 that indicates that calls should be routed through the sound processing unit 210.

At some later point in time (illustrated by FIG. 2B), the mobile telephone 213 receives an incoming call 221 from the user's girlfriend. The mobile telephone 213 provides a signal to the sound processing unit 210 that indicates a need to play the incoming call in the home theater environment 200. In some examples, the signal is the analog or digital representation of the incoming audio (e.g., the ringing or the girlfriend's voice). In other examples, the signal is an instruction in a protocol recognized by the sound processing unit 210 that indicates an incoming audio stream.

Figure 2B:
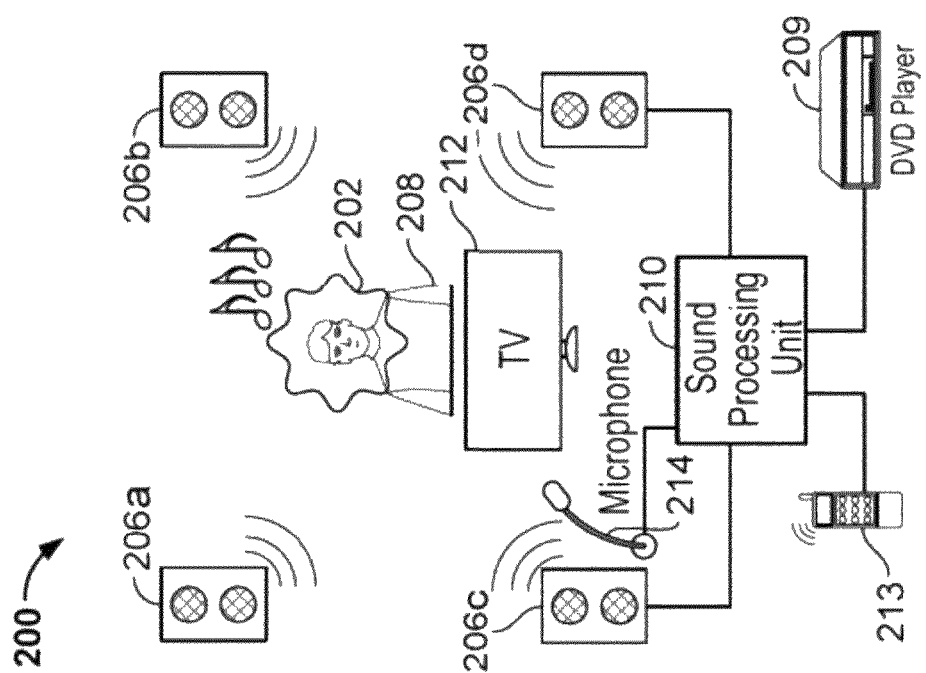

In response to the signal indicating the presence of the incoming call 221, the sound processing unit 210 moves an acoustic image for the movie soundtrack 202 to the right of the user 208 (as viewed from the reader's perspective in FIG. 2B). The sounds from the movie soundtrack can appear from a point source or retain some of their original positioning, but shifted to the right side. For example, as a point source, the movie soundtrack can be perceived by the user 202 as being played from a single virtual speaker to the right. On the other hand, if the movie soundtrack retains some of the original sound positioning, sounds may appear to come from different locations but will generally appear to come from an audio system disposed to the right side of the user. For example, before the incoming call 213 was received, the user perceived a dog barking to the left and a cat meowing to the right. After shifting the acoustic image for the movie soundtrack to the right, the user perceives both sounds as coming from the right, however, the location of the dog's barking is closer to the user than the location of the cat's meowing. It is as if the user stepped to the left several steps past the dog. The movement of the acoustic image can occur automatically based upon predetermined software routines in the sound processing unit 210. No user input need be provided.

In some implementations, a volume of the movie soundtrack 202 is reduced before, during, or after the acoustic image shifts to the side. The reduction in volume is represented by the inward pointing arrows 223 around the cloud 225 that represents the movie soundtrack acoustic image's location.

Figure 2D:
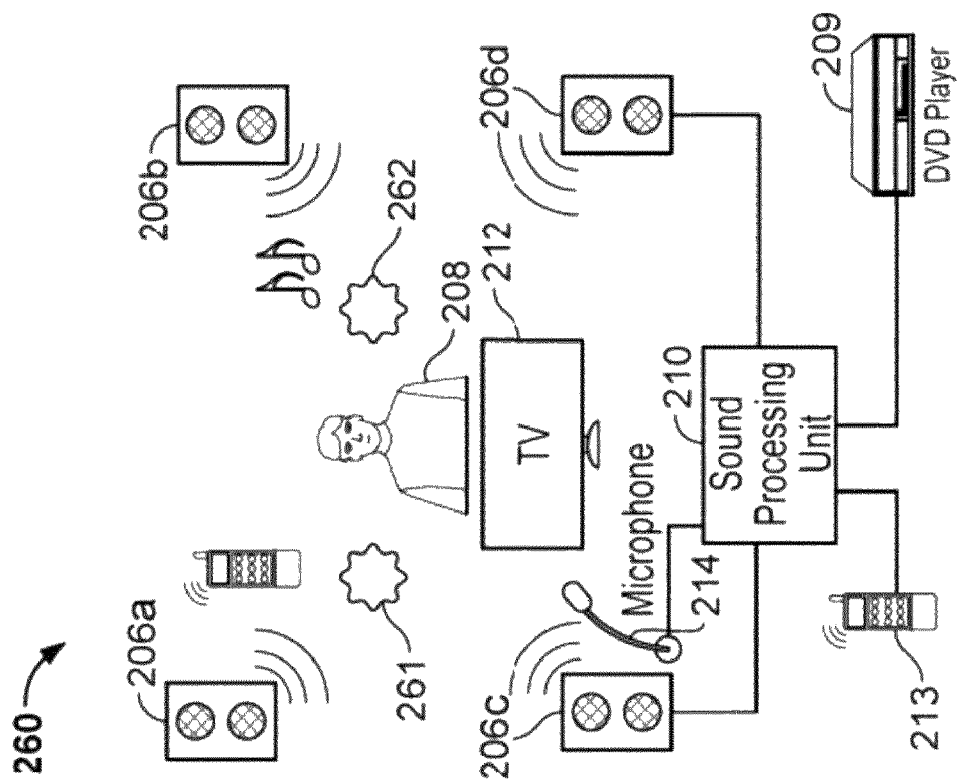
Figure 2C:
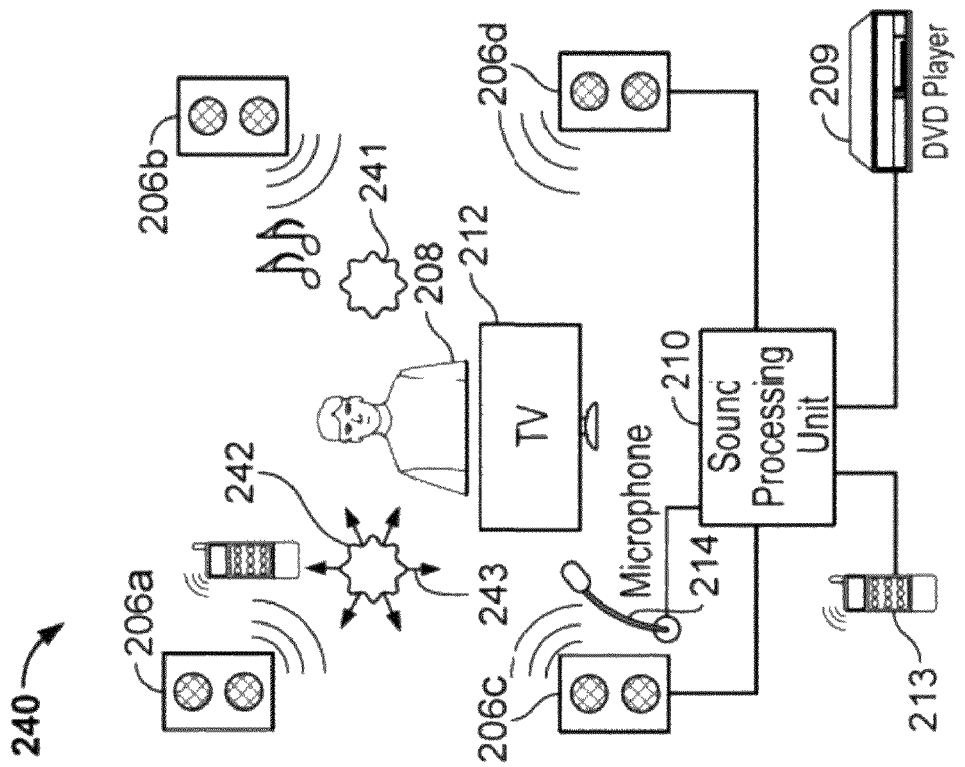

At a later point in time (illustrated by FIG. 2C), an acoustic image for the mobile telephone 242 appears at a location to the left of the user 208. A volume of the audio stream for the mobile telephone can gradually increase, as indicated by the outward arrows 243. The volume of the mobile telephone audio stream eventually stops increasing in volume, as indicated in FIG. 2D.

Now that the acoustic image for the mobile telephone 261 has been established and the mobile telephone audio stream has reached its necessary level, user 208 can speak with his girlfriend. Microphone 214 captures his voice and sound processing unit 210 provides the captured voice signal to the mobile telephone 213. In some implementations, the sound processing unit 210 cancels from the captured voice signal any background sounds from the movie soundtrack audio stream, the mobile telephone audio stream, or both.

In this example, the user 208 suddenly hangs up the telephone, causing a reversal of the operations illustrated in FIGS. 2a-d. For example, the volume of the audio stream for the mobile telephone may decrease until the telephone audio stream is no longer played, the volume of the audio stream for the music soundtrack may increase back to its original level, the acoustic image for the movie soundtrack may shift back toward the user, and the movie soundtrack may again envelop the user 208 (e.g., with DOLBY DIGITAL, DTS, or THX SURROUND EX surround sound).

In some implementations, the locations of the acoustic images for the mobile telephone 261 and the movie soundtrack 262 are substantially equidistant from the user 208 when audio streams from both sources are playing. In other implementations, one source is closer to the user, such as when the source is of higher priority. For example, mobile telephone 213 may prioritize calls from the user's current girlfriend and communicate this priority to the sound processing unit 210. The sound processing unit can position the acoustic image for the mobile telephone two feet in front of the user 208 while placing the acoustic image for the movie soundtrack ten feet behind the user and at a reduced volume.

The particular location for each source may be selected based on understandings about a user's ability to concentrate on an audio stream played in a certain location. For example, if it is determined that users can best concentrate on sound placed directly in front of them, then a highest priority audio stream may be placed in front of users in systems like those described here.

In some implementations, the acoustic image for the introduced mobile telephone 213 audio stream moves during or after its generation. For example, the acoustic image for the mobile telephone 213 can be generated near or around the user 208 and move to the left side until it is located equidistant from the user 208 as illustrated in FIG. 2D.

In some implementations, multiple acoustic images correspond to a single audio source. For example, a user who is participating in a teleconference can perceive separate acoustic images for each of the participants. The user can more easily identify the different speakers who are participating in the conversation. If a speaker jumps in or leaves the conversation, the acoustic images for the modified set of participants can be re-arranged accordingly. The locations of the acoustic images may be coordinated with the locations of different speakers on video monitors that a user may be watching during the teleconference. In another example, a navigational system may include an acoustic image to the left side of the user for "Turn Left" and an acoustic image to the right side of the user for "Turn Right" commands.

In some implementations, the mobile telephone 213 is not only the source of the audio stream for the telephone call but is also the source of the audio and video for the movie watched by the user 208. In these implementations, the mobile telephone 213 can perform the functions of the sound processing unit 210 and output audio signals to any multi-speaker system (e.g., the four floor speakers 206a-d, a car audio system, or headphones). An example of such an integrated system is illustrated in FIG. 3.

In some implementations, a position of a listener of one or more acoustic images is tracked. Positioning of acoustic images may be adjusted to remain, relative to the user, in substantially the same position. As an illustration, the user 208 may walk around the room and acoustic images for the telephone 261 and the movie soundtrack 262 may move with the user. For example, a perceived location of the telephone 261 may appear to the user to radiate from a source one foot to the left of the user 208, even as the user moves about the room. User positioning can be tracked using conventional mechanisms, for example, using accelerometers in a device positioned on the user or proximity sensors located externally to the user. In some implementations, less than all the acoustic images move with the user. For example, a highest priority acoustic image (e.g., a phone call) may remain directly in front of the user as the user moves about the room. The other acoustic images may remain relegated to corners of the room.

Figure 3:
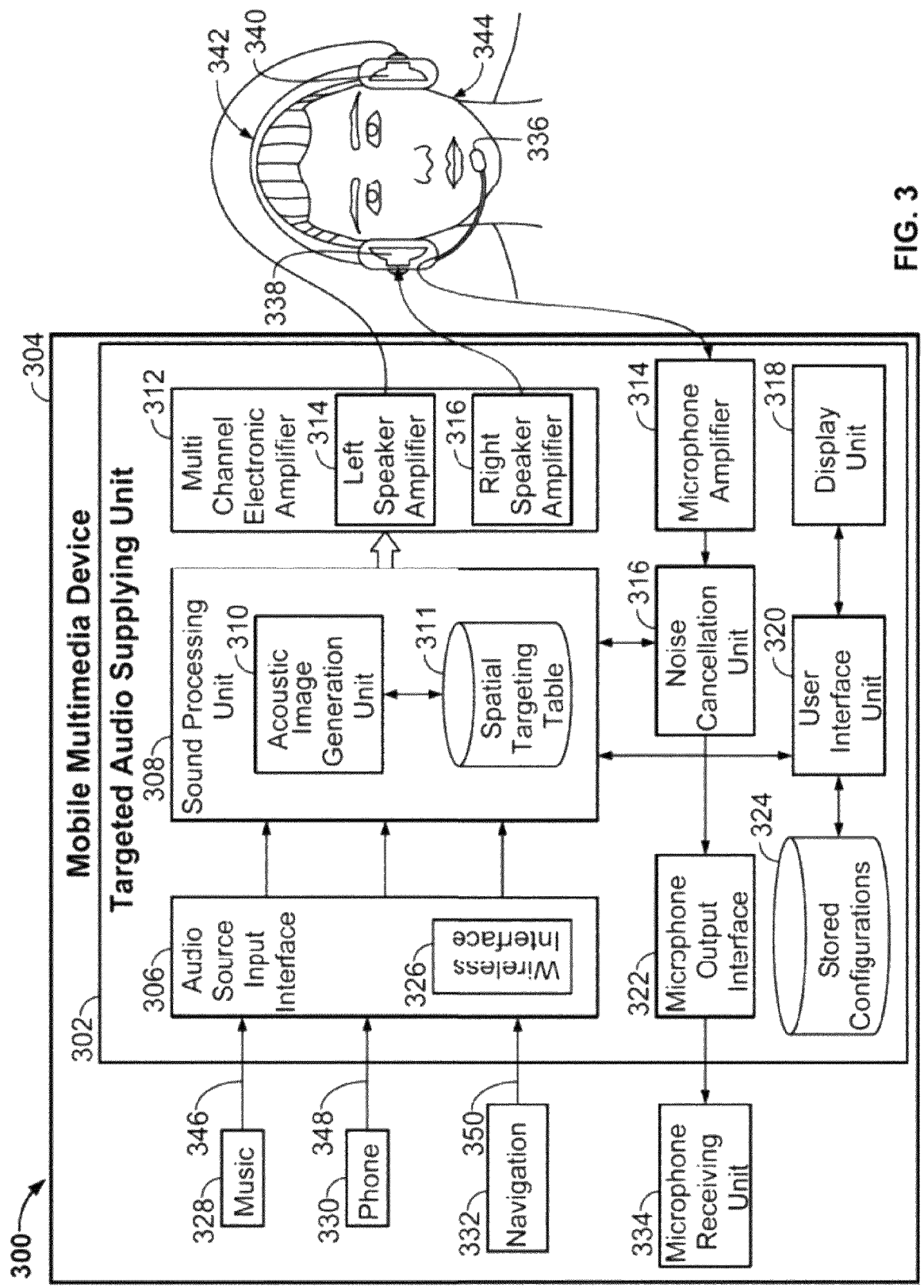
FIG. 3 is block diagram of a system for providing targeted audio to a listener in multi-dimensional space.

FIG. 3 is a block diagram of a system 300 for providing targeted audio to a listener in multi-dimensional space. The system 300 includes a targeted audio supplying unit 302 arranged to receive audio streams from multiple audio sources and provide audio signals to a multi-speaker system to generate an acoustic image for each of the audio streams. The targeted audio supplying unit 302 can be included within a mobile multimedia device 304 that provides the audio streams. In this particular system 300, the sound is provided via wearable headphones having two main speakers. The mobile multimedia device 304 at the center of the system 300 may include, for example, a mobile smartphone or similar multi-function communications device.

The audio streams for a music player 328, telephone 330, and navigational system 332 are received at an audio source input interface 306, that provides the signals to a sound processing module 308. In some implementations, the music player, telephone, and navigational system are applications that operate and are invoked within the mobile multimedia device 304. The sound processing module 308 includes an acoustic image generation unit 310 to generate acoustic images for the audio streams and to manipulate their positions. The sound processing module 308 provides signals to the multi-channel electronic amplifier, which amplifies the analog signals for driving speakers 338 and 340 of the user's headphones 342.

The audio source input interface 306 receives audio streams from at least two audio sources. In this illustration, the interface 306 receives a stream 346 from a music source 328, a stream 348 from a telephone 330, and a stream 350 from a navigation source 332. The sources can be separate devices, but are illustrated in system 300 as all provided by the mobile multimedia device 304. In implementations where the audio sources are provided by separate devices, audio source input interface 306 can provide a physical interface to the targeted audio supplying unit (e.g., ⅛ inch audio jacks or USB ports). In some implementations, a wireless interface 326 enables the targeted audio supplying unit to receive signals wirelessly from the audio sources 328, 330, and 332, for example, using a Bluetooth or Wi-Fi protocols.

The sound processing unit 308 receives audio streams from the interface 306. The sound processing unit 308 can determine adjustments to be made to the audio streams and can mix the audio streams. For example, the sound processing unit can determine which audio streams should play on the headphones 342 and a volume of the audio streams relative to each other. The sound processing unit 308 can also convert audio streams received in digital format to an analog format for amplification by the multi-channel electronic amplifier 312. Such conversion from digital to analog may be made by the amplifier 312 itself.

The sound processing unit 308 includes an acoustic image generation unit 310 to generate acoustic images for the audio streams. The acoustic image generation unit can determine adjustments to be made to the audio stream signals to move an acoustic image for an audio stream in multi-dimensional space. The adjustments can include processing a single channel audio signal to produce a two-channel signal, wherein a determined differential phase and amplitude between the two channels is adjusted on a frequency dependent basis over the entire audio spectrum. The adjustment can be determined by passing the two channels through a transfer function. General methods for creating acoustic images are understood to be well known in the art. One example publication describing the generation of acoustic images is U.S. Pat. No. 5,105,462 to Lowe, et. al.

In some implementations, the acoustic image generation unit 310 identifies values for positioning an audio stream from a spatial targeting table 311. The table can include values for amplitude and phase for each channel corresponding to a desired location. The table can also include transfer functions and values for the transfer functions. In some implementations, the values for positioning an audio stream are determined algorithmically. For example, an algorithm can be used that evenly spaces audio streams from various audio sources in a line, plane, or a volume.

The sound processing unit 308 can provide signals determined to produce acoustic images for one or more of the audio sources to the multi-channel electronic amplifier 312. The amplifier 312 can amplify the low-amplitude electronic signals to an level sufficient to drive the speakers 338 and 340. The multi-channel electronic amplifier 312 includes a right speaker amplifier 314 and a left speaker amplifier 316.

The targeted audio supplying unit 308 can include a microphone amplifier 314 adapted to amplify electronic signals received by the microphone 336. The microphone amplifier 314 can feed the amplified signal to a noise cancellation unit 316 for cancellation of sounds that correspond to one or more of the audio sources 328, 330, and 332 (e.g., if the headphones are really loud). The noise cancellation unit can provide the adjusted signal from the microphone 336 to a microphone output interface 322, that provides the signal to a microphone receiving unit 334 in the mobile communication device 304.

In some implementations, a user interface unit 320 is operable to receive user input for adjusting the operation of the sound processing unit 308 and the acoustic image generation unit 310. The user interface unit 320 can operate in conjunction with a display unit 318 for displaying information about a status of the targeted audio supplying unit 302. User-defined configuration information is stored in the configuration unit 334. Example screenshots of a displays presented by the unit 318 are illustrated in FIGS. 4A-D.

FIGS. 4A-D are screenshots of example user interface displays of user modification of targeted audio positioning in multi-dimensional space. A user listening to audio streams using the systems of FIGS. 1, 2A-D, and 3 can use the example user interfaces to adjust the number, type, and characteristics of audio streams. The user interface can be provided on a mobile telephone, as an targeted audio supplying unit in a car dashboard, or as part of a home entertainment system. In some implementations, the user interface is displayed on a touch screen.

Figure 4A:
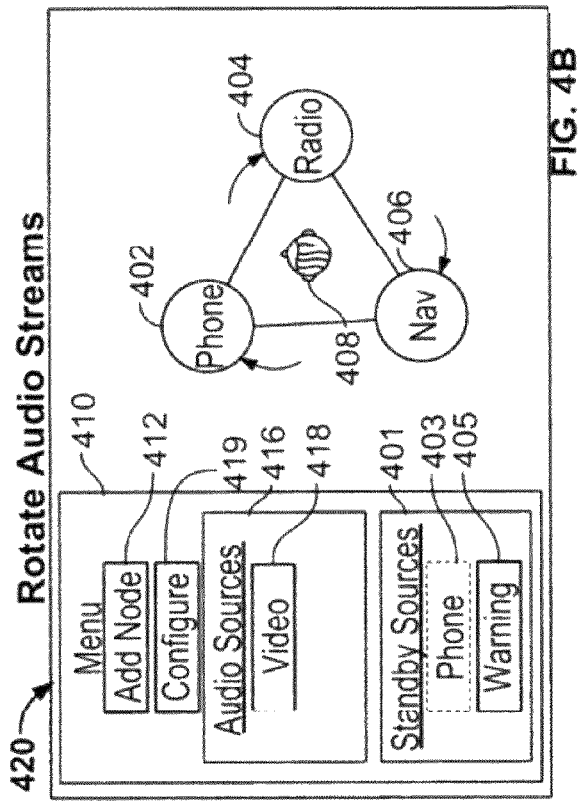
FIGS. 4A-D are screenshots of example user interface displays of user modification of targeted audio positioning in multi-dimensional space.

FIG. 4A displays an example interface display 400 for adding an audio stream to an audio landscape of acoustic images. The display 400 includes audio icons 402, 404, and 406 at locations relative to a user icon 408. The relative locations can correspond to the location of acoustic images for different audio streams relative to a user in actual multi-dimensional space. As an illustration, the display 400 is mounted in the dashboard of a car. The display shows the radio icon 404 to the right-front of the user icon 408, and thus a person sitting in the driver seat hears a radio stream that radiates from the right-front side of the driver. Audio from a telephone call radiates from the left-front side of the driver.

In this illustration, the driver has previously selected the "Add Node" button in the menu 410. Selection of this button adds an "empty" acoustic image to the audio landscape perceived by the driver of the car. For example, before selecting the "Add Node" button 412, the telephone icon 402 was located directly to the left of the user icon 408 and the radio icon 404 was located directly to the right of the user icon 408. Upon selecting the "Add Node" button, the telephone and radio icons slid forward to the locations shown in the display 400 and the "empty" node popped up in the rear. Accordingly, positions of the respective acoustic images moved at the same times and no sound radiated from the location that corresponded to the empty node.

The "empty" icon allows a user of the display 400 to select an available audio source icon and drag the icon to the "empty" node. For example, the driver of the car wants to hear directions to the dinosaur museum and thus drags the "Navigation" icon 414 from the list of available audio sources 416 and places it on the empty node 406. Upon this placement, the driver hears an acoustic image for the navigation system appear behind him.

Every additional user selection of the "Add Node" button 412 adds an additional node to the display 400. In some implementations, the displayed set of nodes can self-adjust into a new geometric configuration. For example, the three nodes in display 400 will adjust to the corners of a square when an additional node is added, and to the corners of a pentagon or pyramid when yet another node is added. In other implementations, the user of the display 400 drags the new node button 412 to a desired location.

The standby sources menu 401 displays a selection of audio streams that will appear on the display 400 as nodes when a signal from the audio stream is received. In this illustration, the telephone icon 403 is included as a standby source. The dashed outline of the telephone icon 403 indicates that the telephone is active at the moment. Accordingly, the telephone icon 402 is also present in the main region of the display, representing the location of an acoustic image for a telephone audio stream. The "Warning" icon 405 is also included as a standby audio stream. This audio stream can play warning sounds from the car. For example, when the car is running low on gas, the acoustic images for the telephone, radio and navigation system will move to allow space for an acoustic image for the warning audio stream. The stream can play "The fuel is low, please pull off to a gas station immediately." The telephone and warning icons 403 and 405 can be selected from the audio sources menu 416.

Figure 4B:
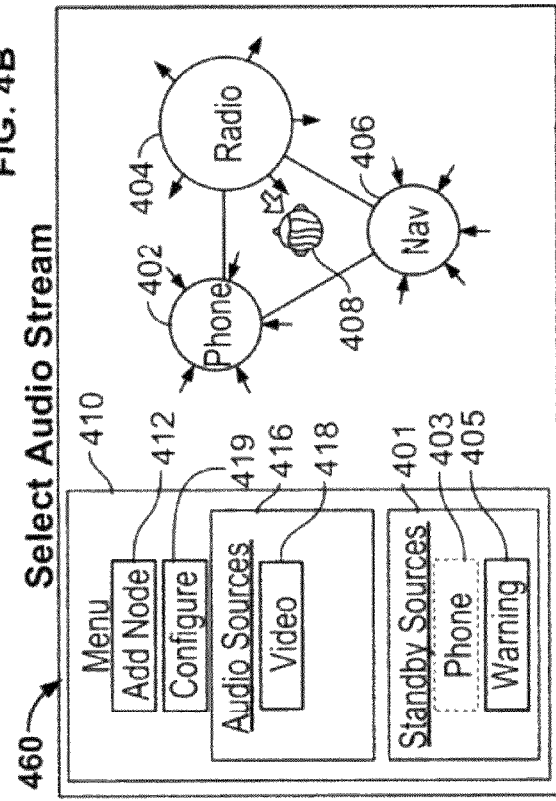

FIG. 4B illustrates an example use of the display 420 to rotate the audio sources. The driver has used his finger to touch the telephone icon 402 on the display 420 and rotate the source clockwise. In this illustration, the telephone and navigation icons also rotate as though they were fixed to the corners of a rigid triangle. In some implementations, a rotate command is received, and instead of a gradual rotation, the audio streams essentially "jump forward" to the next node. For example, a driver in the car may say "Rotate Clockwise." The telephone acoustic image may jump from his left-front to his right front, the radio acoustic image may jump from his right-front to his rear, and the navigation acoustic image may jump from his rear to his left-front.

Figure 4C:
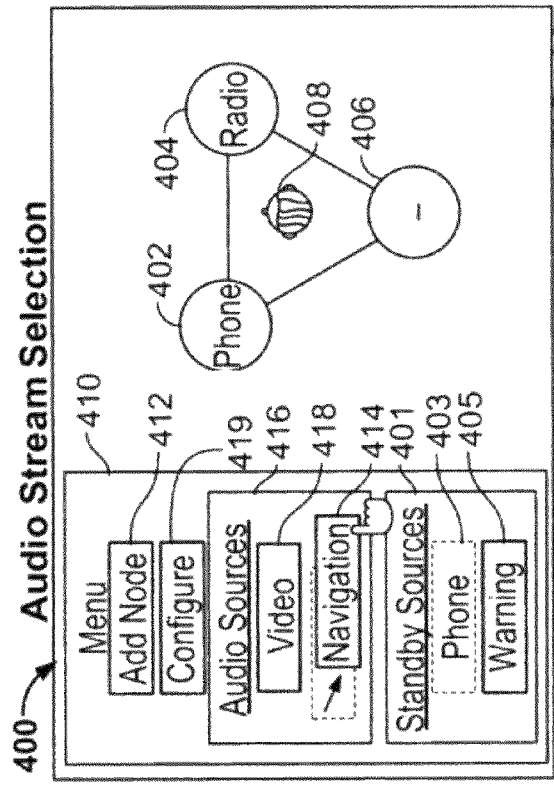

FIG. 4C illustrates an example use of the display 440 to change the volume of an audio stream. In this illustration, the driver uses two fingers to touch the telephone icon 402 and stretch the icon apart, effectively increasing the icons size and also increasing a volume of the audio stream for the telephone.

Figure 4D:
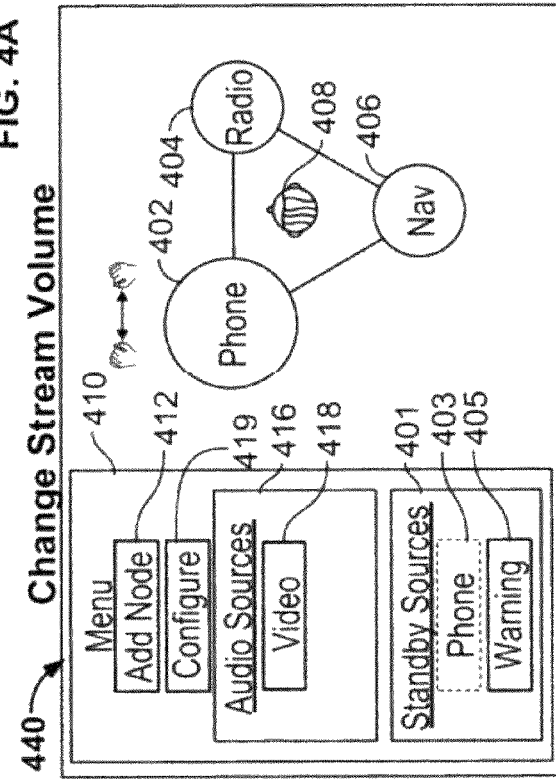

FIG. 4D illustrates an example use of the display 460 to select an audio stream to envelop the user. For example, the user may double-tap the radio icon 404. The radio icon increases in size and moves toward the user icon 408 to surround the user icon. At the same time, the telephone and navigation icons 402 and 406 decrease in size. Corresponding changes occur to the acoustic images in multi-dimensional space, as perceived by the driver of the car. This feature allows a driver to easily select from multiple audio streams or sources. For example, a radio station that the driver is listening to may go to commercial. The driver may say "All audio streams." In response, the audio stream for the present radio station may shift to the side and audio streams for several additional radio stations may pop up around him. The driver can focus on each station and select one to play alone by double-tapping the respective icon on the display 460 or speaking an appropriate audio command.

A configure button 419 enables the driver of the car to further refine the operation of the targeted audio supplying unit 302. The driver can configure a default arrangement when additional nodes are added (e.g., whether five nodes are arranged in the shape of a pentagon or a pyramid). Default volume levels can be set for each audio stream. The operation of the system when a new audio source is introduced can be configured. For example, when a telephone call is received, at what position does it appear, to where do the other acoustic images move, and is the telephone call introduced at a higher volume?

Figure 5:
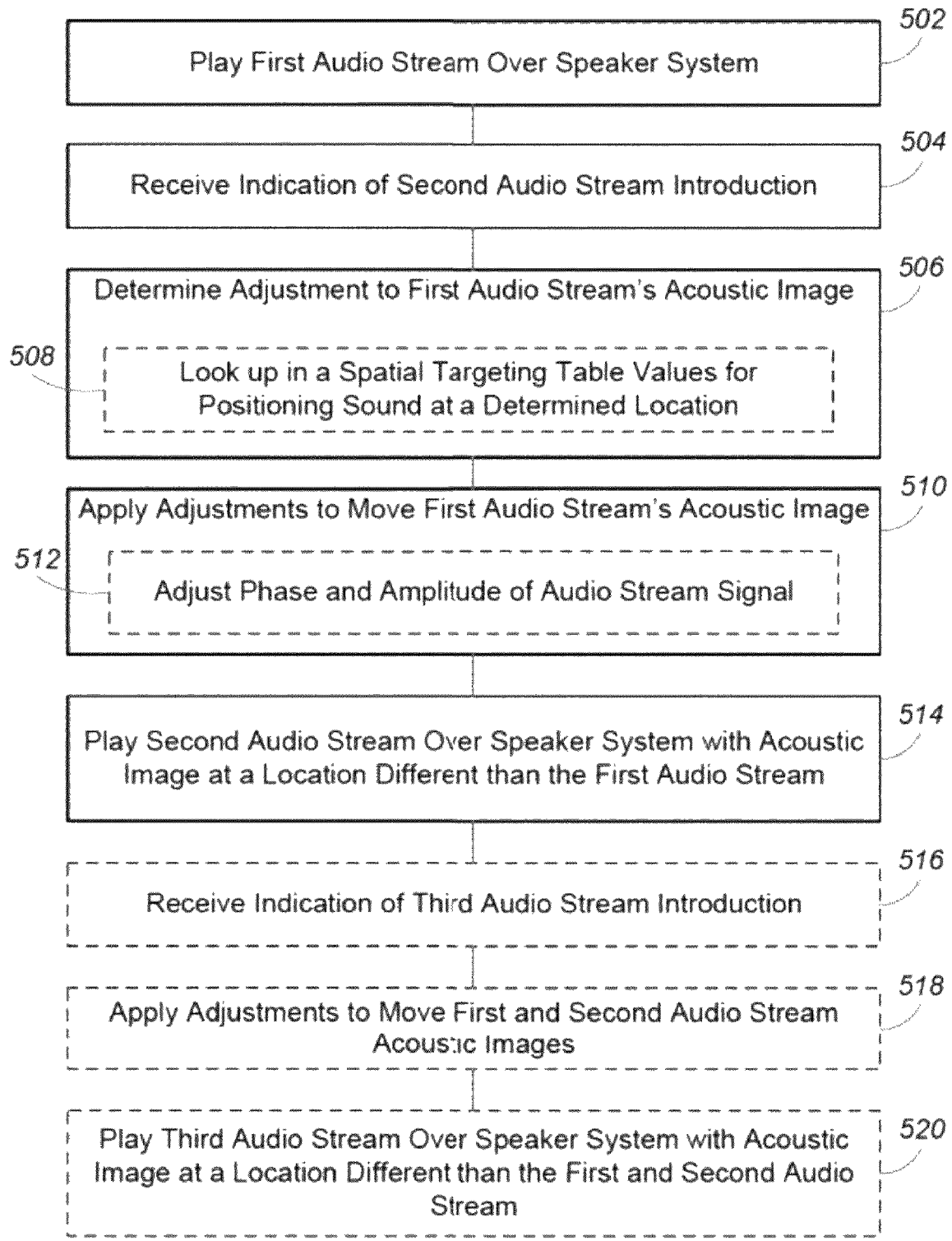
FIG. 5 is a flowchart depicting an example process for providing targeted audio to a listener in multi-dimensional space.

FIG. 5 is a flowchart depicting an example process for providing targeted audio to a listener in multi-dimensional space. In box 502, a first audio stream is played over a speaker system. As an example, a business person may be listening over a pair of headphones to an audio book while waiting for a plane to arrive at an airport. The audio book may appear to come from a single location (e.g., in front of the business person) or from all around the business person. The device that provides the audio book audio stream may be a smartphone that includes an audio book application that the business person downloaded from an online application store.

In box 504, an indication of a second audio stream introduction is received. For example, one of the business person's clients may call the business person. In some implementations, the indication is the call received at the smart telephone. In other implementations, the indication is the smartphone providing the audio signal (e.g., the stream 348) to an audio supplying unit 302. In some implementations, the smartphone provides a separate triggering signal to the audio supplying unit 302.

In box 506, an adjustment to the first audio stream's acoustic image can be determined. For example, the smartphone may determine that a virtual source for the audio book stream should appear to drift to the right side of the user. In some implementations, determining adjustments to the first audio stream's acoustic image includes retrieving, from the smartphone or a remote device, settings that identify a determined location that the acoustic image should move to. The determined location can be dependent on a type of the second audio stream (e.g., whether the second audio stream is a telephone call or just a smartphone system beep). The determined location can also depend on the number of audio streams being played to the user.

In some implementations, the smartphone retrieves, from a spatial targeting table, values for positioning sound at the determined location (box 508). For example, adjustments to perform the movement of the virtual audio source can be identified by accessing a table of transfer functions or variables for transfer functions. The transfer functions may describe operations needed to place a sound at a particular location or locations in space (approximately), and move the sound to that location in space. The transfer functions may operate, for example, on the relative amplitude and timing (as expressed by signal phase) of sounds emitted from different speakers in a multiple-speaker sound system. The differences and amplitude and timing can be designed to "trick" a listener into thinking that a source for the sound is coming from a particular location in space (even though the speakers supplying the audio stream may be located at positions different from the location that the user perceives the sound is originating from).

In box 510, adjustments are applied to move the first audio stream's acoustic image to the determined location. For example, the transfer functions may be applied to signals provided by a digital processing unit or by an analog amplifier to adjust the phase and amplitude of the first audio stream's acoustic image (box 512). The phase and amplitude may be adjusted over a period of time to create the impression that a source of the audio stream is moving from a first position to a second position. The business man may be aware that a perceived source of the audio book stream is moving to a different position in multi-dimensional space.

In box 514, a second audio stream is played over the speaker system, with an acoustic image for the second audio stream positioned in a different location than the first audio stream. For example, the business man may hear the sound of a telephone ringing. The sound of the ringing may appear to come from the business man's left side and slowly get louder. Because the audio book stream is now positioned to the business man's right side, the sound of the telephone ringing is easy to identify and distinguish from the noises in the audiobook (even if the audio book included the sound of a different ringing telephone).

In box 516, indication of an introduction of a third audio stream is received. For example, the business man may have identified emergency notifications from the emergency broadcast system as audio streams that the smartphone may add to his listening space. In this example, as the business man is waiting in the airport terminal, the national weather service has spotted a tornado nearby. An emergency broadcast that warns of the tornado is broadcast and the business man's smartphone receives the broadcast. The smartphone processes the incoming signal and notifies the targeted audio supplying unit 302 that a third audio stream will be added to the business man's listening space.

In box 518, adjustments to move the first and second audio stream acoustic images are applied. For example, the business man's smart telephone may adjust the audio signals for the audio book and the telephone call so that a virtual source location of each audio stream appears to move. The streams for the audio book and the telephone call may appear move from the left and right side of the business man to behind the business man.

In box 520, a third audio stream is played over the speaker system with an acoustic image at a location different than the first and second audio streams. For example, the audio stream for the emergency broadcast may appear to the business man to come from a source that is in front of the business man. The other two audio streams may appear to come from behind the business man.

Figure 6:
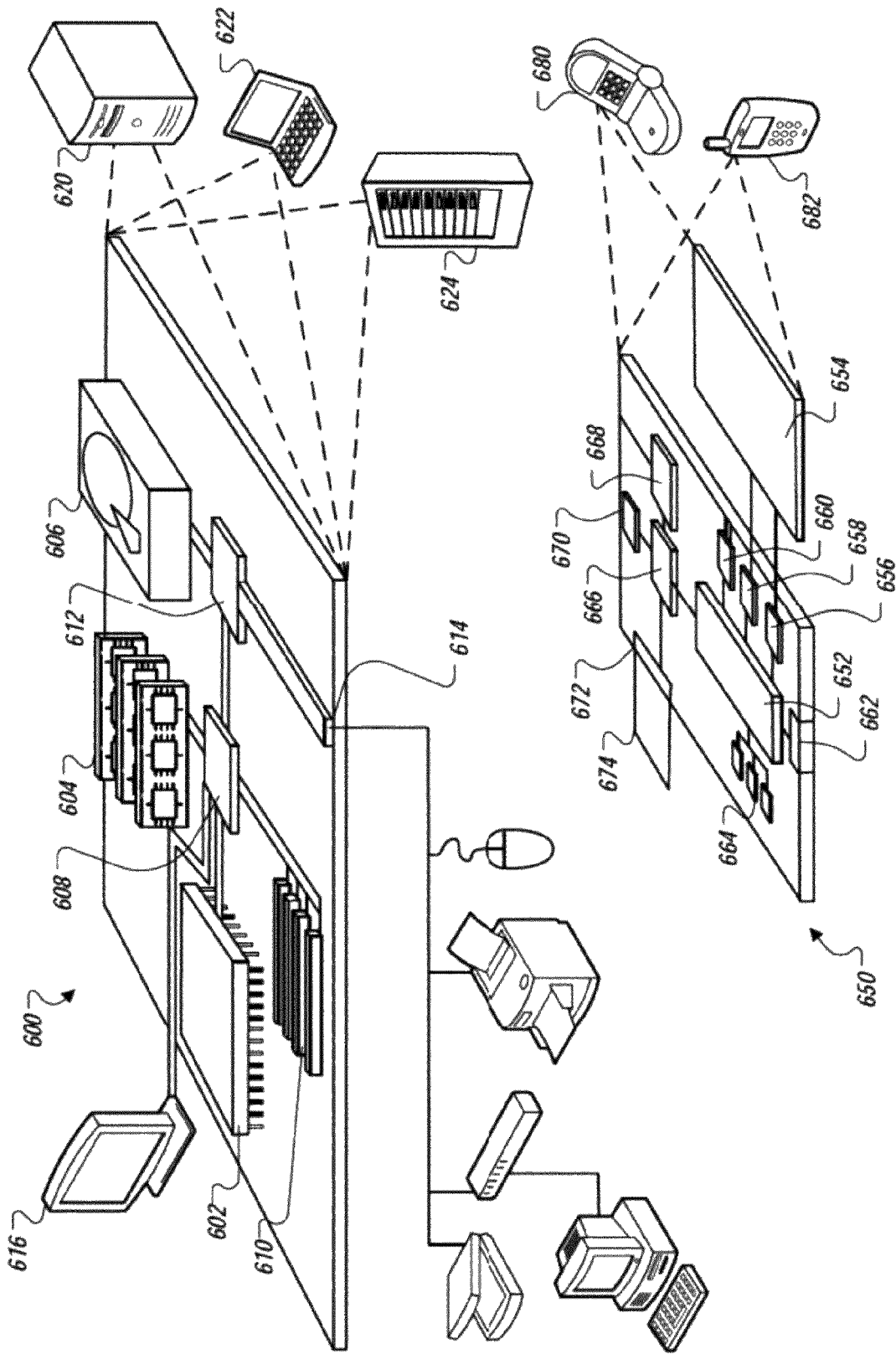
FIG. 6 is a block diagram of computing devices that may be used to implement the systems and methods described in this document, as either a client or as a server or plurality of servers.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. Additionally computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for providing targeted audio to a listener in multi-dimensional space may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method for providing sound from multiple audio sources, the method comprising:

playing a first audio stream from a first source through a multi-speaker audio system;

receiving a signal indicating a need to play a second audio stream from a second source through the multi-speaker audio system;

determining adjustments to be made to the first audio stream to move an acoustic image of the first audio stream in multi-dimensional space from a first location to a second location, wherein an acoustic image is an apparent location of a source of an audio stream; and applying adjustments to a signal of the first audio stream in order to move the acoustic image of the first audio stream from the first location to the second location; and playing the second audio stream so that an acoustic image of the second audio stream is located in a third location that is different from the second location, and simultaneously playing the first audio stream in the second location.

2. The computer-implemented method of claim 1, wherein the first audio stream comprises a stream of playing music, and the second audio stream comprises a portion of a spoken conversation.

3. The computer-implemented method of claim 2, wherein the spoken conversation is carried on between a synthesized voice warning unit and a user listening to the first and second audio streams.

4. The computer-implemented method of claim 2, wherein the spoken conversation is a two-way spoken conversation between an incoming telephone caller and a user listening to the first and second audio streams.

5. The computer-implemented method of claim 1, wherein applying the adjustments comprises adjusting phase and volume of the signal of the first audio stream independent of other audio streams.

6. The computer-implemented method of claim 5, wherein adjusting the phase and volume of the signal comprises performing a lookup in a spatial targeting table that identifies values for positioning a sound at a determined location in three-dimensional space.

7. The computer-implemented method of claim 1, wherein moving the acoustic image of the first audio stream from the first location to the second location comprises moving the acoustic image of the first audio stream to a location substantially behind a user who is listening to the first audio stream, and wherein playing the second audio stream so that an acoustic image of the second audio stream is located in a third location that is different from the second location comprises placing the acoustic image of the second audio stream at a location substantially in front of the user.

8. The computer-implemented method of claim 1, further comprising:
receiving user input indicating a need to rotate the locations of the acoustic images; and
applying adjustments to signals of the first audio stream and the second audio stream in order to rotate the locations acoustic images substantially about a position of a user listening to the first and second audio streams.

9. The computer-implemented method of claim 1, further comprising:
receiving a second signal indicating a need to play a third audio stream from a third source;
in response to receiving the second signal:
applying adjustments to the signal of the first audio stream in order to move the acoustic image of the first audio stream to a new location; and
applying adjustments to a signal of the second audio stream in order to move the acoustic image of the second audio stream to a new location; and
playing the third audio stream so that an acoustic image of the third audio stream is located in a location that is different from the new locations of the acoustic images for the first and second audio streams.

10. The computer-implemented method of claim 1, further comprising presenting data for displaying icons corresponding to the first and second audio streams on a visual display of a computing device, and where the icons are located at locations on the display corresponding to locations of the acoustic images in multi-dimensional space.

11. The computer-implemented method of claim 1, wherein the acoustic images for the first audio stream and the second audio stream are controlled virtual sound sources that appear to a listener to be separate from the locations of the speakers in the multi-speaker audio system.

12. A system for providing positional sound from multiple audio sources, the system comprising:
a multi-channel electronic amplifier arranged to produce signals for producing audible sound on multiple independent channels;
a plurality of individually addressable speakers, with each speaker connected to one of the channels of the electronic amplifier; and
an acoustic image generation unit programmed to modify a signal for a first audio stream upon identifying an arrival of a second audio stream, so as to provide one or more signals to the amplifier so that an acoustic image for the first audio stream is positioned at a location in multi-dimensional space that is separated from a location in multi-dimensional space for an acoustic image of the second audio stream when the first and second audio streams are reproduced simultaneously by the speakers, wherein an acoustic image is an apparent location of a source of an audio stream.

13. The system of claim 12, further comprising:
a microphone amplifier arranged to receive signals from a microphone and provide the signals for transmission as an outgoing channel of a two-way spoken communication session, wherein at least one of the audio streams includes received audio from an incoming channel of the two-way communication; and
a sound cancellation unit to cancel noise received at the microphone amplifier that is from audio streams that do not include the incoming channel of the two-way communication.

14. The system of claim 12, further comprising:
an electronic device arranged to wirelessly transmit an audio stream; and
a wireless interface adapted to wirelessly receive the second audio stream and identify arrival of the second audio stream to the acoustic image generation unit.

15. The system of claim 12, further comprising:
a display device arranged to display icons at locations in the display device that represent a spatial arrangement of the acoustic images in multi-dimensional space.

16. The system of claim 15, further comprising:
an input device arranged to (a) receive user input selecting an audio stream from a collection of audio streams, and (b) assign the selected audio stream to a location in the displayed representation of the spatial arrangement of the acoustic images;
wherein the acoustic image generation unit modifies a signal for the selected audio stream, so as to provide one or more signals to the amplifier so that an acoustic image for the selected audio stream is positioned at a location in multi-dimensional space that corresponds to the assigned location in the displayed representation of acoustic images.

17. The system of claim 12, wherein the acoustic image generation unit is further programmed to modify the signal for the first audio stream upon identifying the arrival of the second audio stream, so as to provide one or more signals to the amplifier in order to move the acoustic image of the first audio stream from a first location to the positioned location.

18. The system of claim 12, wherein providing the one or more signals to the amplifier includes adjusting phase and volume of the signal for the first audio stream independent of the second audio stream.

19. The system of claim 12, wherein the acoustic image generation unit is further programmed to modify the signal for the first audio stream and a signal for the second audio stream upon identifying an arrival of a third audio stream, so as to provide one or more signals to the amplifier so that the acoustic images for the first audio stream and second audio stream are positioned at locations in multi-dimensional space that are separated from a location in multi-dimensional space for an acoustic image of the third audio stream when the first, second, and third audio streams are reproduced simultaneously by the speakers.

20. A system for providing positional sound from multiple audio sources, the system comprising:
a multi-channel electronic amplifier arranged to produce signals for producing audible sound on multiple independent channels;
a plurality of individually addressable speakers, with each speaker connected to one of the channels of the electronic amplifier; and
means for modifying a signal for a first audio stream upon identifying an arrival of a second audio stream, so as to provide one or more signals to the amplifier so that an acoustic image for the first audio stream is positioned at a location in multi-dimensional space that is separated from a location in multi-dimensional space for an acoustic image of the second audio stream when the first and second audio streams are reproduced simultaneously by the speakers, wherein an acoustic image is an apparent location of a source of an audio stream.

* * * * *